May 24, 1927.
S. E. TRAVIS, JR
1,630,145
TRUCK BODY MOUNT
Filed March 17, 1926
2 Sheets-Sheet 2
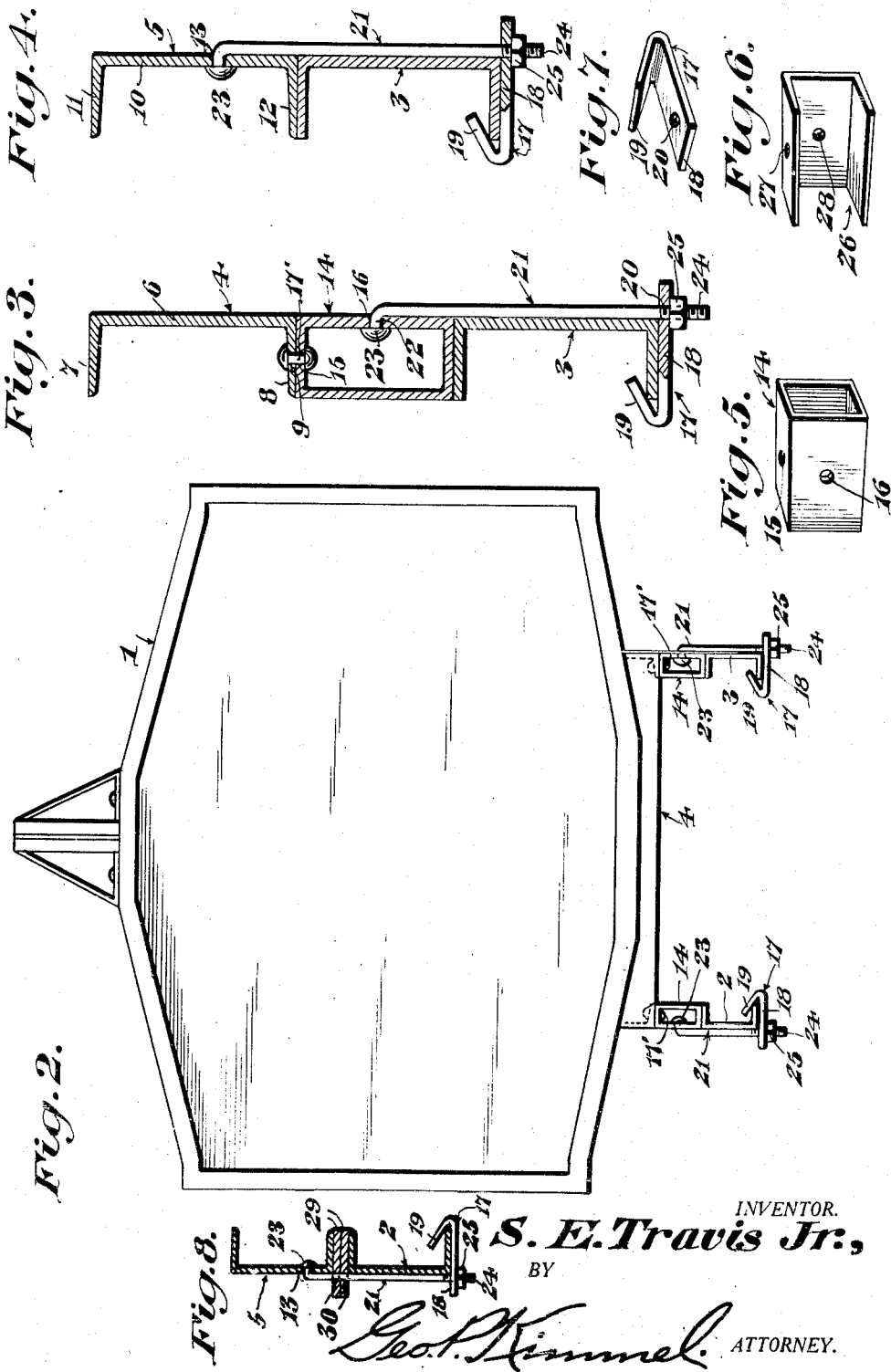
INVENTOR.
S. E. Travis Jr.,
BY
Geo. P. Kimmel
ATTORNEY.

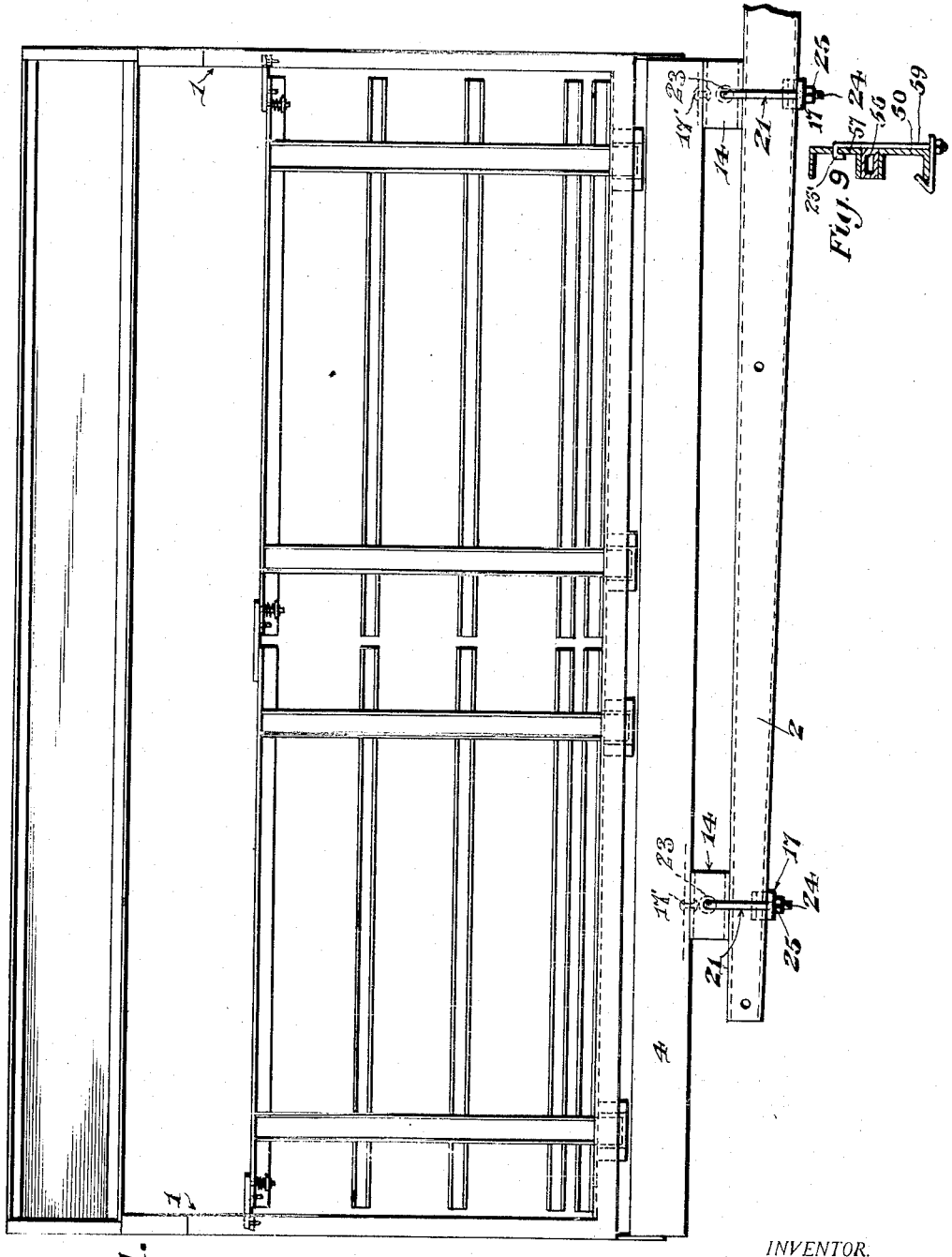

Patented May 24, 1927.

1,630,145

UNITED STATES PATENT OFFICE.

SIMEON E. TRAVIS, JR., OF HATTIESBURG, MISSISSIPPI.

TRUCK-BODY MOUNT.

Application filed March 17, 1926. Serial No. 95,331.

This invention relates to a truck body mount, and has for its object to provide, in a manner as hereinafter set forth, means for expeditiously mounting and detachably securing a truck body to the chassis of a truck.

A further object of the invention is to provide, in a manner as hereinafter set forth, a truck body mount including means for expeditiously and detachably securing a truck body to and in spaced relation with respect to the chassis of a truck.

Further objects of the invention are to provide, in a manner as hereinafter set forth, a truck body mount which is simple in its construction and arrangement, strong, durable, thoroughly efficient in its use, conveniently connected to the chassis of a truck and comparatively inexpensive to manufacture.

With the foregoing and other objects in view the invention consists of the novel construction, combination and arrangement of parts as hereinafter more specifically described and illustrated in the accompanying drawings, wherein is shown embodiments of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a truck body mount, in accordance with this invention, and illustrating the same with respect to the truck body and the chassis of the truck.

Figure 2 is a view looking at one end of Figure 1.

Figure 3 is a vertical sectional view of the mount of the spacer type.

Figure 4 is a vertical sectional view of the mount of the non-spacing type.

Figure 5 is a perspective view of the spacer element.

Figure 6 is a perspective view of a modified form of spacer element.

Figure 7 is a perspective view of the coupling member.

Figure 8 is a vertical sectional view of a modified form of truck body mount of the spacing type.

Figure 9 is a vertical sectional view of a modified form of truck body mount.

Referring to the drawings in detail, 1 denotes a truck body and 2, 3 the side bars of the chassis of a truck.

The truck body 1 is mounted on a sub-frame and in Figures 2 and 3 the sub-frame is indicated at 4. In Figures 4 and 8 the sub-frame is indicated at 5. The sub-frame 4 includes a pair of side members in the form of oppositely disposed channel irons 6 having the flanges thereof indicated at 7, 8 and with the latter provided with spaced openings 9. The sub-frame 5 includes an oppositely disposed pair of side members in the form of channel irons 10 having the flanges thereof indicated at 11, 12. The body portion of each member 10 is formed with spaced openings 13.

Each sub-frame is secured to the bottom of the truck body and is of materially less width than the width of the latter.

Referring to Figures 1, 2, 3 and 5 of the drawings, the mount includes two pair of spacers and as the spacers of each pair are of the same construction, but one will be described, as the description of one will apply to the other. Each of the spacers is referred to generally by the reference character 14 and it consists of a hollow rectangular body portion having its top wall formed with an opening 15 and its outer side wall with an opening 16. One pair of spacers is mounted upon the top flange of the chassis bar 2 and the other pair of spacers mounted on the top flange of the chassis bar 3. The spacers of each pair are arranged in spaced relation and each pair of spacers has mounted thereon the flange 8 of a channel bar 6. The openings 15 of each pair of spacers register with the openings formed in the flange 8 of the channel bar 6 and each pair of spacers is riveted, as at 17' to that channel bar 6 with which it associates. The registering openings 9 and 15 are provided with a passage for the rivets which secure the spacers to the sub-frame. The spacers provide means for supporting the sub-frame 4 in spaced relation with respect to the chassis of the truck. The spacer 14 can be of any appropriate height or length, but the width thereof corresponds to the width of the top flanges of the side bars of the chassis.

Associated with each spacer 14 and that chassis bar upon which the spacer is mounted is a clamping device for detachably securing the sub-frame 4 and spacers to the chassis. Each clamping device consists of a hook-shaped coupling member 17 comprising a rectangular body portion 18 and a bill 19. The length of the body portion 18 is materially greater than the width of a flange of a side bar of the chassis. The body portion 18 has its inner end terminate in the bill 19 and is formed in proximity to its outer end with an opening 20. When the coupling member 17 is arranged in coupling position the body portion 18 thereof is positioned against the lower face of the lower flange of a side bar of the chassis and the bill 19 overlaps the inner side of such flange. The body portion 18 projects a substantial distance outwardly with respect to a side bar of the chassis so that the opening 20 will be positioned outwardly with respect to such bar. The clamping device further includes a connecting bar 21 having its upper terminal portion bent inwardly at an angle, as at 22 and which is formed with a head 23. The angled-shaped portion 22 of the bar 21 is extended through the opening 16 formed in the spacer 14 and the head 23 abuts against the inner face of the outer side wall of the spacer. The bar 21 extends down through the opening 20 in the body portion 18 of the coupling member and the lower terminal portion of the bar 21 is peripherally threaded as at 24. Threadably engaging with the lower terminal-portion 24 of the bar 21 is a clamping nut 25, which abuts against the lower face of the body portion 18 of the coupling member and in connection with the latter and also in connection with the head 23 of the bar 21, clamps the spacer 14 to the chassis bar and as the sub-frame is secured to the spacer the latter is also secured in position with respect to the chassis.

Referring to Figure 4, the spacers as shown in Figures 1 and 3 and which are interposed between the sub-frame 4 and the side bars of the chassis are dispensed with, and the sub-frame, which is indicated at 5 in Figure 4, is mounted directly upon the side bars of the chassis. The clamping device shown in Figure 4 is the same as that heretofore referred to, but in lieu of the angle-shaped upper terminal portion 22 of the bar 21 extending through the opening 16 in the spacer 14 it extends through the opening 13 in a side bar of the sub-frame. The construction shown in Figure 4 provides for the mounting of the sub-frame directly upon the side bars of the chassis. The clamping device shown in Figure 4 is provided with the same reference characters employed in connection with the clamping device shown in Figure 3.

Referring to Figure 6 of the drawings, a modified form of spacer is shown, and which is referred generally by the reference character 26, and which is of yoke-shaped form and provided with openings 27 and 28. The opening 27 is provided for riveting the spacer to the sub-frame and the opening 28 is employed for the passage of the angle-shaped upper terminal portion 22 of the bar 21.

Referring to Figure 8 of the drawings, the spacers disclosed thereby are arranged in superposed relation and each of which is indicated at 29. Each spacer 29 consists of a plate formed with an opening 30. The plate is of greater width than the width of a flange of the channel iron of the sub-frame or the flange of a side bar of the chassis. The spacers 29 project outwardly from the sub-frame and chassis bar. The spacers are interposed between the sub-frame and the chassis bar. The openings 30 of the spacers align and extending therethrough is the connecting bar 21 of the clamping device. The side bar of the sub-frame shown in Figure 8 is the same as that shown in Figure 4 and is formed with the opening 13 for the passage of the angle-shaped upper terminal portion of the connecting bar. The clamping device shown in Figure 8 is of the same construction as that shown in Figures 3 and 4 and the same reference characters are employed to indicate the parts of said device.

Sub-frame 5 can of course, be of a cross section other than channel shaped.

Spacer 14 would not need opening 15 if it were welded to flange 8.

The width of spacer 14 does not have to correspond to the width of the top flange of the side bars of the chassis.

Connecting bar 21 does not have to have a head 23. It may be bent inwardly and downwardly to form a hook 23ª as shown in Figure 9.

The form shown in Figure 9 is substantially the same as that shown in Figure 4, with this exception that a spacing element 56 is interposed between the sub-frame member 57 and the chassis side bar 58. The coupling device is referred to generally at 59 and is substantially similar to the coupling device shown in Figure 4.

It is thought the many advantages of a truck body mount, in accordance with this invention, can be readily understood, and although the preferred embodiment of the invention is as illustrated and described, yet it is to be understood that changes in the details of construction can be had which will fall within the scope of the invention as claimed.

What I claim is:

1. A truck body mount comprising in combination, a chassis, a truck body supporting structure mounted thereon, spaced coupling members positioned against the bottom of each side of the chassis, each of said members straddling the inner side edge and projecting from the outer side edge of that bottom with which it is associated, connecting bars extending into the sides of said supporting structure and each having means at its upper end for connecting it to such structure, each of said bars depending from the supporting structure and extending through that portion of a coupling member extended from the chassis, and means mounted on the lower ends of said bars and abutting against said members for clamping the members and bars together.

2. A truck body mount comprising in combination, a chassis, a sub-frame for the truck body, two sets of spacer elements, the elements of each set arranged in spaced relation, each set interposed between the sub-frame and a side of the chassis, means for securing said elements to said sub-frame, a set of spaced coupling members positioned against the bottom of each side of the chassis, each coupling member straddling the inner side edge and projecting from the outer side edge of that bottom with which it is associated, connecting bars having their upper ends extended into the spacer elements from the outer sides thereof, said bars having means at their upper ends for connecting them to said elements, each of said bars depending from one of said elements and extending through that portion of a coupling member which projects from the chassis, and means carried on the lower ends of the bars for clamping them and the coupling members together.

In testimony whereof, I affix my signature hereto.

SIMEON E. TRAVIS, Jr.